US011478856B2

(12) United States Patent
Ferrar et al.

(10) Patent No.: US 11,478,856 B2
(45) Date of Patent: Oct. 25, 2022

(54) SELECTIVE LASER SOLIDIFICATION APPARATUS AND METHOD

(71) Applicant: RENISHAW PLC, Wotton-under-Edge (GB)

(72) Inventors: Ben Ian Ferrar, Stoke-on-Trent (GB); Ceri Brown, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 580 days.

(21) Appl. No.: 16/409,911

(22) Filed: May 13, 2019

(65) Prior Publication Data
US 2019/0262946 A1 Aug. 29, 2019

Related U.S. Application Data

(62) Division of application No. 14/896,161, filed as application No. PCT/GB2014/051775 on Jun. 10, 2014, now Pat. No. 10,335,901.

(30) Foreign Application Priority Data

Jun. 10, 2013 (GB) ...................................... 1310276
Jun. 11, 2013 (GB) ...................................... 1310398

(51) Int. Cl.
*B22F 12/00* (2021.01)
*B29C 64/153* (2017.01)
(Continued)

(52) U.S. Cl.
CPC .......... *B22F 12/00* (2021.01); *B23K 26/0604* (2013.01); *B23K 26/082* (2015.10);
(Continued)

(58) Field of Classification Search
CPC ................ B23K 26/082; B23K 26/144; B23K 26/0604; B23K 26/342; B22F 10/20;
(Continued)

(56) References Cited

U.S. PATENT DOCUMENTS 4,863,538 A * 9/1989 Deckard ................. B22F 10/20
264/497
5,017,317 A * 5/1991 Marcus .................. B33Y 10/00
264/81
(Continued)

FOREIGN PATENT DOCUMENTS

CN 1286654 A 3/2001
CN 101626881 A 1/2010
(Continued)

OTHER PUBLICATIONS

Bechtold et al. "Evaluation of disparate laser beam deflection technologies by means of number and rate of resolvable spots". Optics Letters, vol. 38, No. 16, p. 2934-2937, 2013.
(Continued)

*Primary Examiner* — Eric S Stapleton
(74) *Attorney, Agent, or Firm* — Oliff PLC

(57) ABSTRACT

A selective laser solidification apparatus including; a powder bed onto which powder layers can be deposited, at least one laser module for generating a plurality of laser beams for solidifying the powder material deposited onto the powder bed, a laser scanner for individually steering each laser beam to solidify separate areas in each powder layer, and a processing unit. A scanning zone for each laser beam is defined by the locations on the powder bed to which the laser beam can be steered by the laser scanner. The laser scanner is arranged such that each scanning zone is less than the total area of powder bed and at least two of the scanning zones overlap. The processing unit is arranged for selecting, for at least one powder layers, which laser beam to use to scan an area of the powder layer located within a region wherein the seaming zones overlap.

8 Claims, 7 Drawing Sheets

(51) Int. Cl.
*B23K 26/082* (2014.01)
*B23K 26/144* (2014.01)
*B23K 26/342* (2014.01)
*B23K 26/06* (2014.01)
*B22F 10/10* (2021.01)
*B33Y 10/00* (2015.01)
*B33Y 30/00* (2015.01)
*B33Y 40/00* (2020.01)
*B33Y 50/02* (2015.01)

(52) U.S. Cl.
CPC .......... *B23K 26/144* (2015.10); *B23K 26/342* (2015.10); *B29C 64/153* (2017.08); *B22F 10/10* (2021.01); *B33Y 10/00* (2014.12); *B33Y 30/00* (2014.12); *B33Y 40/00* (2014.12); *B33Y 50/02* (2014.12); *Y02P 10/25* (2015.11)

(58) Field of Classification Search
CPC ........ B22F 12/00; B22F 10/10; B29C 64/153; B29C 64/393; B33Y 10/00; B33Y 30/00; B33Y 50/02; B33Y 40/00; Y02P 10/25
USPC ....................................................... 219/76.12
See application file for complete search history.

(56) References Cited

U.S. PATENT DOCUMENTS

| | | | |
|---|---|---|---|
| 5,089,185 A * | 2/1992 | Hirano | B29C 64/135 264/401 |
| 5,155,321 A * | 10/1992 | Grube | B33Y 40/00 264/497 |
| 5,155,324 A * | 10/1992 | Deckard | C23C 26/02 264/497 |
| 5,247,180 A * | 9/1993 | Mitcham | B29C 64/129 250/492.1 |
| 5,304,329 A * | 4/1994 | Dickens, Jr. | B29C 64/153 264/497 |
| 5,316,580 A * | 5/1994 | Deckard | B22F 7/02 118/110 |
| 5,342,919 A * | 8/1994 | Dickens, Jr. | B33Y 70/00 528/323 |
| 5,352,405 A * | 10/1994 | Beaman | C23C 24/10 419/45 |
| 5,387,380 A * | 2/1995 | Cima | B41J 2/09 264/69 |
| 5,393,482 A * | 2/1995 | Benda | B22F 10/20 419/1 |
| 5,427,733 A * | 6/1995 | Benda | B33Y 40/00 419/1 |
| 5,490,882 A * | 2/1996 | Sachs | B22F 10/10 134/1 |
| 5,527,877 A * | 6/1996 | Dickens, Jr. | B29C 41/003 528/323 |
| 5,534,104 A * | 7/1996 | Langer | B29C 64/135 156/275.5 |
| 5,536,467 A * | 7/1996 | Reichle | G03F 7/70416 264/401 |
| 5,730,925 A * | 3/1998 | Mattes | B29C 64/153 264/497 |
| 5,753,171 A * | 5/1998 | Serbin | B33Y 30/00 264/401 |
| 5,786,562 A * | 7/1998 | Larson | H05B 7/20 219/137 R |
| 5,846,370 A * | 12/1998 | O'Connor | B33Y 30/00 156/272.8 |
| 5,908,569 A * | 6/1999 | Wilkening | B29C 64/295 219/385 |
| 5,985,204 A * | 11/1999 | Otsuka | B29C 64/153 264/497 |
| 6,042,774 A * | 3/2000 | Wilkening | B23K 26/082 264/497 |
| 6,197,575 B1 * | 3/2001 | Griffith | B01J 19/0046 435/288.4 |
| 6,203,861 B1 * | 3/2001 | Kar | B33Y 10/00 427/554 |
| 6,215,093 B1 * | 4/2001 | Meiners | B23K 26/32 219/121.61 |
| 6,391,251 B1 * | 5/2002 | Keicher | F01D 5/187 419/7 |
| 6,534,740 B1 * | 3/2003 | Meiners | B22F 10/20 219/121.65 |
| 6,554,600 B1 * | 4/2003 | Hofmann | B29C 64/259 425/174.4 |
| 6,583,379 B1 * | 6/2003 | Meiners | B23K 26/123 219/121.6 |
| 6,621,039 B2 * | 9/2003 | Wang | B22F 10/20 219/121.6 |
| 6,683,780 B2 * | 1/2004 | Thomas | G01D 5/2415 361/283.2 |
| 6,815,636 B2 * | 11/2004 | Chung | B29C 64/153 219/121.65 |
| 6,930,278 B1 * | 8/2005 | Chung | B23K 35/0244 219/121.85 |
| 6,932,935 B1 * | 8/2005 | Oberhofer | B33Y 10/00 264/497 |
| 6,989,115 B2 * | 1/2006 | Russell | B33Y 10/00 264/39 |
| 7,047,098 B2 * | 5/2006 | Lindemann | B22F 10/20 700/119 |
| 7,204,684 B2 * | 4/2007 | Ederer | B29C 64/259 425/174.4 |
| 7,296,599 B2 * | 11/2007 | Cox | B33Y 40/00 141/67 |
| 7,357,629 B2 * | 4/2008 | Weiskopf | B29C 64/153 425/188 |
| 7,378,052 B2 * | 5/2008 | Harryson | B33Y 10/00 419/7 |
| 7,387,359 B2 * | 6/2008 | Hernandez | B41J 2/16552 347/29 |
| 7,515,986 B2 * | 4/2009 | Huskamp | G05D 23/1919 700/207 |
| 7,550,518 B2 * | 6/2009 | Bredt | B29C 41/003 523/160 |
| 7,569,174 B2 * | 8/2009 | Ruatta | B29C 64/153 264/497 |
| 7,790,096 B2 * | 9/2010 | Merot | B29B 13/021 264/497 |
| 7,874,445 B2 * | 1/2011 | Hochsmann | B29C 64/153 220/211 |
| 7,976,302 B2 * | 7/2011 | Halder | B33Y 30/00 425/182 |
| 8,137,609 B2 * | 3/2012 | McAlea | B33Y 30/00 264/497 |
| 8,137,739 B2 * | 3/2012 | Philippi | B29C 64/153 427/8 |
| 8,172,562 B2 * | 5/2012 | Mattes | B29C 64/153 425/174.4 |
| 8,282,377 B2 * | 10/2012 | Higashi | B29C 64/371 425/174.4 |
| 8,753,105 B2 * | 6/2014 | Scott | B33Y 30/00 425/338 |
| 9,114,478 B2 * | 8/2015 | Scott | B23K 26/12 |
| 9,272,446 B2 * | 3/2016 | Grebe | B29C 35/0805 |
| 10,337,335 B2 * | 7/2019 | Pavlov | B23K 26/342 |
| 2002/0090313 A1 * | 7/2002 | Wang | B22F 12/00 419/10 |
| 2002/0105114 A1 * | 8/2002 | Kubo | B29C 64/165 264/497 |
| 2002/0152002 A1 * | 10/2002 | Lindemann | B29C 64/153 700/119 |
| 2003/0206820 A1 * | 11/2003 | Keicher | B29C 64/40 419/9 |
| 2004/0045941 A1 * | 3/2004 | Herzog | B23K 26/02 219/121.6 |
| 2004/0094728 A1 * | 5/2004 | Herzog | B23K 26/0876 250/559.06 |

(56) References Cited

U.S. PATENT DOCUMENTS

| | | | | |
|---|---|---|---|---|
| 2004/0099996 A1* | 5/2004 | Herzog | ............. | B33Y 30/00 264/401 |
| 2004/0200816 A1* | 10/2004 | Chung | ............. | B29C 64/153 219/121.83 |
| 2005/0116391 A1* | 6/2005 | Lindemann | ............. | B29C 64/357 264/497 |
| 2005/0142024 A1* | 6/2005 | Herzog | ............. | B29C 64/153 419/53 |
| 2005/0179772 A1* | 8/2005 | Ishikawa | ............. | B41J 2/45 347/255 |
| 2005/0237590 A1 | 10/2005 | Van Saarloos | | |
| 2005/0263933 A1* | 12/2005 | Welch, IV | ............. | B33Y 30/00 264/113 |
| 2005/0263934 A1* | 12/2005 | Chung | ............. | B29C 64/153 264/113 |
| 2006/0048706 A1* | 3/2006 | Cheong | ............. | H01L 29/66848 118/715 |
| 2006/0118532 A1* | 6/2006 | Chung | ............. | B22F 3/1028 219/121.85 |
| 2006/0141089 A1* | 6/2006 | Larsson | ............. | B29C 64/153 425/174 |
| 2006/0215246 A1* | 9/2006 | Kerekes | ............. | B29C 64/135 359/201.1 |
| 2006/0219315 A1* | 10/2006 | Cox | ............. | B65G 53/22 141/67 |
| 2006/0219671 A1* | 10/2006 | Merot | ............. | B33Y 40/00 219/121.6 |
| 2006/0249485 A1* | 11/2006 | Partanen | ............. | B33Y 30/00 219/121.6 |
| 2007/0001342 A1* | 1/2007 | Oberhofer | ............. | B33Y 10/00 264/237 |
| 2007/0037037 A1* | 2/2007 | Nguyen | ............. | H01M 8/0258 429/483 |
| 2007/0057412 A1* | 3/2007 | Weiskopf | ............. | B33Y 10/00 264/497 |
| 2007/0126157 A1* | 6/2007 | Bredt | ............. | B33Y 40/00 264/334 |
| 2007/0176851 A1* | 8/2007 | Willey | ............. | G02B 27/0093 345/32 |
| 2008/0131540 A1* | 6/2008 | Perret | ............. | B29C 64/153 425/63 |
| 2008/0190905 A1* | 8/2008 | Heinlein | ............. | B29C 64/153 219/121.73 |
| 2008/0241392 A1* | 10/2008 | Dimter | ............. | B33Y 70/00 427/256 |
| 2009/0017220 A1* | 1/2009 | Muller | ............. | B33Y 10/00 427/493 |
| 2009/0206065 A1* | 8/2009 | Kruth | ............. | B23K 26/0665 219/121.66 |
| 2009/0266803 A1* | 10/2009 | Perret | ............. | B23K 26/123 219/121.85 |
| 2009/0291308 A1* | 11/2009 | Pfister | ............. | B33Y 70/00 428/402 |
| 2010/0043698 A1* | 2/2010 | Bolt | ............. | B29C 64/153 118/46 |
| 2010/0233012 A1* | 9/2010 | Higashi | ............. | B22F 10/20 419/9 |
| 2011/0001950 A1* | 1/2011 | DeVoe | ............. | G03F 7/70375 355/67 |
| 2011/0061591 A1* | 3/2011 | Stecker | ............. | G05B 19/4099 118/663 |
| 2011/0135840 A1* | 6/2011 | Doye | ............. | B23K 35/38 427/554 |
| 2011/0285060 A1* | 11/2011 | Yamamoto | ............. | B29C 64/153 264/401 |
| 2011/0291331 A1* | 12/2011 | Scott | ............. | B22F 10/322 264/510 |
| 2012/0126457 A1* | 5/2012 | Abe | ............. | B22F 12/00 264/460 |
| 2012/0251378 A1* | 10/2012 | Abe | ............. | B29C 64/153 419/55 |
| 2013/0112672 A1* | 5/2013 | Keremes | ............. | B23K 26/0676 219/121.78 |
| 2013/0270750 A1* | 10/2013 | Green | ............. | B23K 26/046 264/497 |
| 2014/0154088 A1* | 6/2014 | Etter | ............. | B22F 10/20 416/223 R |
| 2014/0252687 A1* | 9/2014 | El-Dasher | ............. | B22F 10/20 264/497 |
| 2014/0263209 A1* | 9/2014 | Burris | ............. | B23K 26/082 219/121.62 |
| 2014/0271965 A1* | 9/2014 | Ferrar | ............. | B29C 64/182 425/163 |
| 2014/0348691 A1* | 11/2014 | Ljungblad | ............. | B33Y 10/00 419/53 |
| 2015/0158111 A1* | 6/2015 | Schwarze | ............. | B33Y 30/00 219/121.34 |
| 2015/0174827 A1* | 6/2015 | Schwarze | ............. | B22F 12/00 700/120 |
| 2015/0210013 A1* | 7/2015 | Teulet | ............. | B29C 64/141 264/497 |
| 2015/0283761 A1* | 10/2015 | Maeda | ............. | B29C 64/393 264/408 |
| 2016/0136730 A1* | 5/2016 | McMurtry | ............. | G02B 26/101 425/162 |
| 2016/0363869 A1* | 12/2016 | Hou | ............. | G03F 7/0037 |
| 2017/0136578 A1* | 5/2017 | Yoshimura | ............. | B23K 26/082 |
| 2017/0304894 A1 | 10/2017 | Buller | | |

FOREIGN PATENT DOCUMENTS

| | | |
|---|---|---|
| CN | 101835554 A | 9/2010 |
| CN | 101960385 A | 1/2011 |
| CN | 102328081 A | 1/2012 |
| CN | 102438779 A | 5/2012 |
| CN | 103317233 A | 9/2013 |
| CN | 103846437 A | 6/2014 |
| CN | 104001915 A | 8/2014 |
| CN | 104802400 A | 7/2015 |
| DE | 4302418 A1 | 8/1994 |
| DE | 19953000 A1 | 5/2001 |
| DE | 102005014483 A1 | 10/2006 |
| EP | 0 406 513 A1 | 1/1991 |
| EP | 1466 718 A2 | 10/2004 |
| EP | 1 441 897 B1 | 8/2006 |
| EP | 1 705 616 A1 | 9/2006 |
| EP | 2 221 132 A1 | 8/2010 |
| EP | 1 993 812 B1 | 7/2011 |
| EP | 2431113 A1 | 3/2012 |
| EP | 2 514 553 A2 | 10/2012 |
| EP | 2 565 294 A1 | 3/2013 |
| JP | S532091 U | 1/1978 |
| JP | H03-120509 A | 5/1991 |
| JP | H4-113828 A | 4/1992 |
| JP | H5-124115 A | 5/1993 |
| JP | H11-05254 A | 1/1999 |
| JP | 2000/263650 A | 9/2000 |
| JP | 2002-079393 A | 3/2002 |
| JP | 2002/144437 A | 5/2002 |
| JP | 2004-514053 A | 5/2004 |
| JP | 2005/089863 A | 4/2005 |
| JP | 2009/006509 A | 1/2009 |
| JP | 2009-108348 A | 5/2009 |
| JP | 2009-108350 A | 5/2009 |
| JP | 2009-183970 A | 8/2009 |
| JP | 2011-514556 A | 5/2011 |
| JP | 2011-240713 A | 12/2011 |
| JP | 2013-169796 A | 9/2013 |
| JP | 2015-166178 A | 9/2015 |
| WO | 91/12120 A1 | 8/1991 |
| WO | 92/08592 A1 | 5/1992 |
| WO | 92/20505 A1 | 11/1992 |
| WO | 96/29634 A1 | 9/1996 |
| WO | 2009/108543 A2 | 9/2009 |
| WO | 2010/007396 A1 | 1/2010 |
| WO | 2010/026397 A1 | 3/2010 |
| WO | 2011/064725 A1 | 6/2011 |
| WO | 2012-052525 A1 | 4/2012 |
| WO | 2013-003457 A1 | 1/2013 |

(56) References Cited

FOREIGN PATENT DOCUMENTS

| WO | 2013/024297 A1 | 2/2013 |
| WO | 2014/176536 A1 | 10/2014 |
| WO | 2014/180971 A1 | 11/2014 |
| WO | 2014/199149 A1 | 12/2014 |
| WO | 2015/003804 A1 | 1/2015 |
| WO | 2015/040433 A2 | 3/2015 |
| WO | 2015/113408 A1 | 8/2015 |
| WO | 2015/151864 A1 | 10/2015 |

OTHER PUBLICATIONS

Bechtold et al. "Beam shaping and high-speed, cylinder-lens-free beam guiding using acousto-optical deflectors without additional compensation optics". Optics Express, vol. 21, No. 12, 2013.
SolidStateScan: Solid state laser beam scanner for ultra-high-speed scanning in cw laser applications, p. 1-28, 2015.
Romer et al. "Electro-optic and acousto-optic laser beam scanners". Physics Procedia, vol. 56, p. 29-39, 2014.
Pereira et al. "Contributions for the next generation of 3D metal printing machines". Proceedings SPIE, vol. 9353, p. 935318-1-935318-10, 2015.
Lu, Xiaodong. "Electromagnetically-Driven Ultra-Fast Tool Servos for Diamond Turning". Massachusetts Institute of Technology, p. 1-351, 2005.
Jun. 27, 2016 International Search Report issued in International Patent Application No. PCT/GB2016/050869.
Feb. 4, 2016 Search Report issued in United Kingdom Patent Application No. GB1505458.8.
Jun. 27, 2016 Written Opinion issued in International Patent Application No. PCT/GB2016/050869.
Sep. 28, 2018 Chinese Office Action issued in Chinese Patent Application No. 201680019343.X.
Long et al. "Modeling and design of a normal stress electromagnetic actuator with linear characteristics for fast steering mirror" from "Optical Engineering 53(5), 054192 (May 2014)" (Year: 2014).
Jul. 21, 2021 Notice of Allowance issued in U.S. Appl. No. 16/507,522.
Aug. 4, 2014 International Search Report issued in International Patent Application No. PCT/GB2014/051775.
Aug. 4, 2014 Written Opinion issued in International Patent Application No. PCT/GB2014/051775.
Jan. 17, 2014 Search Report issued in British Patent Application No. 1310276.9.
Jul. 2, 2014 Search Report issued in British Patent Application No. 1310398.1.
Sep. 9, 2014 International Search Report issued in International Patent Application No. PCT/GB2014/051791.
Sep. 9, 2014 Written Opinion issued in International Patent Application No. PCT/GB2014/051791.
U.S. Appl. No. 14/897,152, filed Dec. 9, 2015 in the name of McMurtry et al.
U.S. Appl. No. 14/896,161, filed Dec. 4, 2015 in the name of Ferrar et al.
Wilkening, Christian "Fast production of Technical Prototypes Using Direct Laser Sintering of Metals and Foundry Sand", EOS GMBH. pp. 133-140.
Oct. 27, 2016 Office Action issued in Chinese Patent Application No. 2014-80044241.4.
Dec. 7, 2016 Chinese Office Action issued in Chinese Patent Application No. 201480046346.3.
Sep. 21, 2017 Office Action issued in U.S. Appl. No. 14/897,152.
Sep. 5, 2017 Office Action issued in Chinese Application No. 201480044241.4.
Jun. 14, 2018 Office Action issued in U.S. Appl. No. 14/897,152.
Jun. 19, 2018 Office Action issued in Japanese Patent Application No. 2016-518583.
Jul. 24, 2018 Office Action issued in Japanese Patent Application No. 2016-518582.
Oct. 9, 2018 Office Action Issued in U.S. Appl. No. 14/896,161.
Nov. 5, 2018 Office Action issued in Chinese Patent Application No. 201480044241.4.
Nov. 15, 2018 Extended Search Report issued in European Patent Application No. 18187563.4.
Jan. 8, 2019 Office Action issued in Japanese Patent Application No. 2016-518583.
Feb. 19, 2019 Office Action issued in U.S. Appl. No. 14/897,152.
Jul. 13, 2022 Notice of Allowance issued in U.S. Appl. No. 16/655,881.

\* cited by examiner

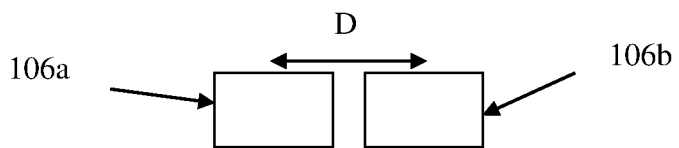
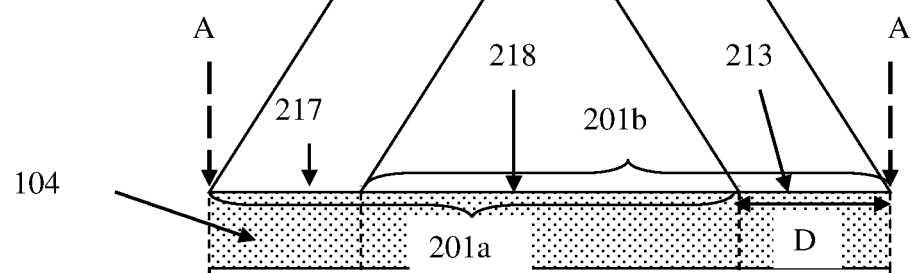
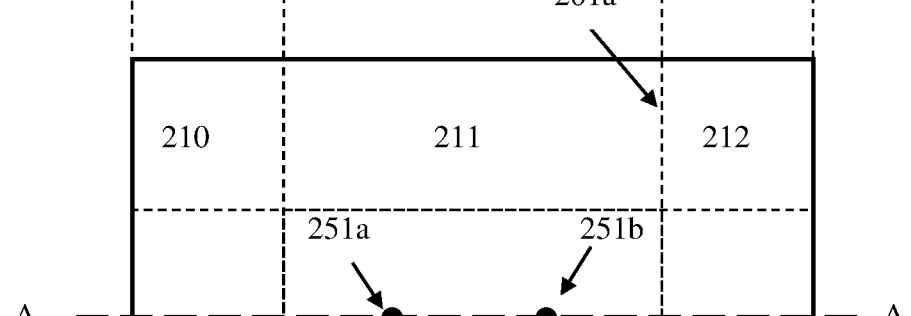
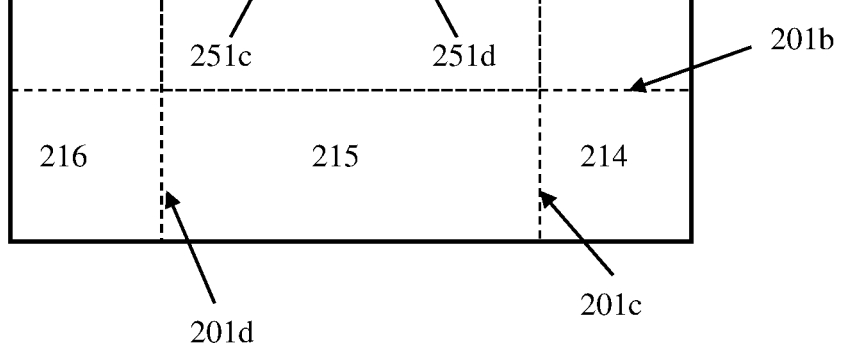
Fig. 5a
Fig. 5b

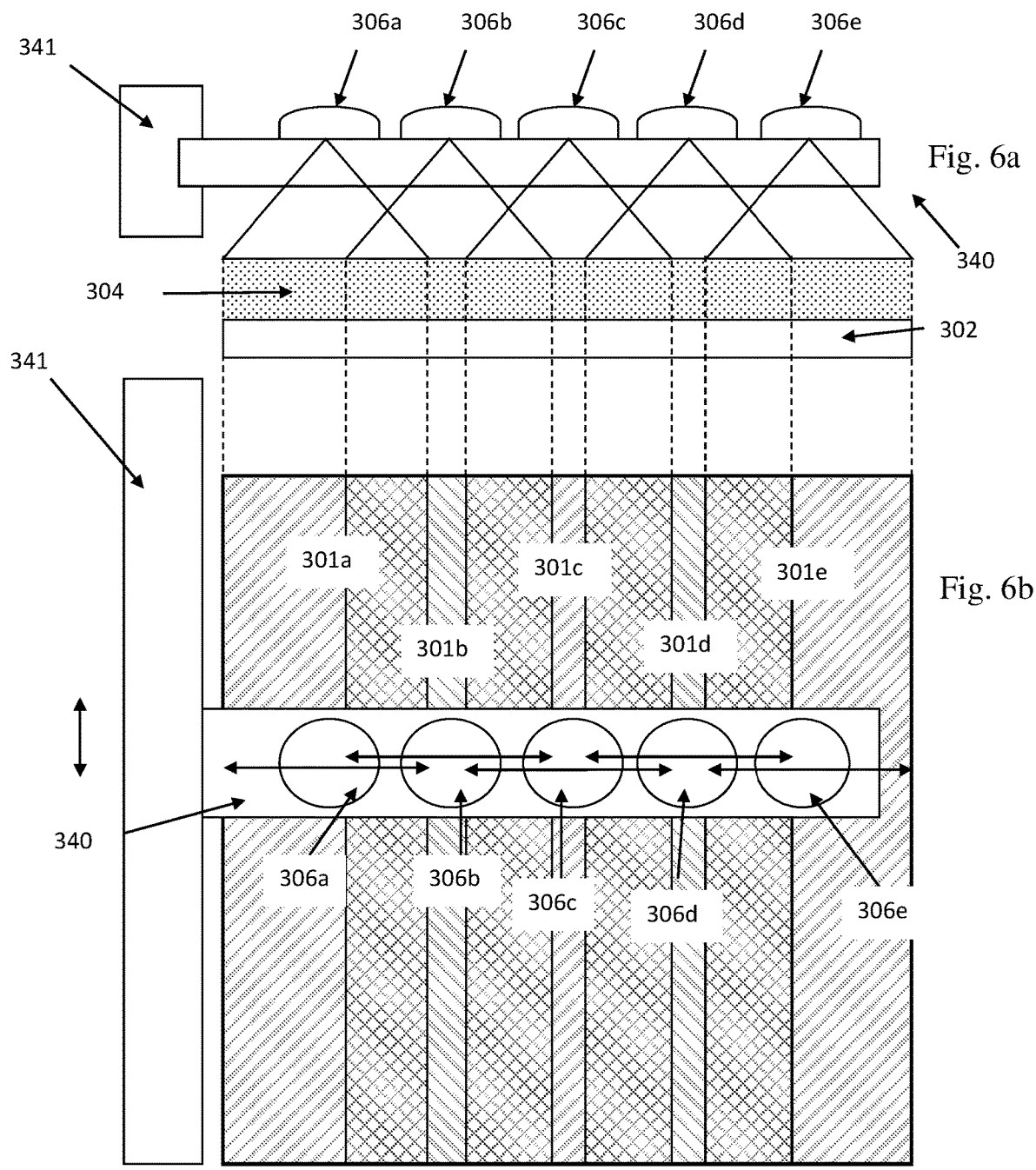

SELECTIVE LASER SOLIDIFICATION APPARATUS AND METHOD

This application is a divisional of U.S. patent application Ser. No. 14/896,161 filed on Dec. 4, 2015, which in turn is a National Stage of International Patent Application PCT/GB2014/051775 filed Jun. 10, 2014, which claims the benefit of Great Britain Patent Application No. 1310276.9 filed on Jun. 10, 2013 and Great Britain Patent Application No. 1310398.1 filed on Jun. 11, 2013. The disclosure of each of the prior applications is incorporated herein by reference in their entirety.

The present invention relates to selective laser solidification and, in particular, to a selective laser melting process and apparatus in which multiple laser beams are used to solidify the layers, separate areas of a layer solidified by different laser beams.

BACKGROUND

Additive manufacturing or rapid prototyping methods for producing objects comprise layer-by-layer solidification of a material, such as a metal powder material, using a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one object can be built, the objects spaced apart in the powder bed.

It is known from DE102005014483 A1 to use four laser beams, each laser beam solidifying powder in a different quadrant of the powder bed. Such an arrangement may increase build speed because different parts of an object or different objects located in different quadrants can be built simultaneously with different laser beams. However, the lasers may be underutilised during the build if, for any one of the lasers, the area to be solidified is larger in one of the quadrants than in the others. For such a layer, the lasers of the other quadrants will be off whilst the laser for the quadrant comprising the largest area to be solidified completes solidification of that area. Therefore, there is a limit on the speed of the build set by the time it takes the laser of the quadrant with the largest area to be solidified. As the laser modules are a very expensive part of the apparatus, significantly increasing the cost of the apparatus by increasing the number of lasers but, at the same time, not using some of the lasers for large durations of the build is undesirable.

US201.3/0112672 A1 discloses an additive manufacturing assembly for producing a plurality of laser beams for melting layers of material in an additive manufacturing process. Each laser beam is separately and independently directed to different regions within the workspace. Each region comprises overlapping areas within adjacent regions. The overlapping extension of each of the laser beams provides a consistent melting of powdered metal at the boundaries separating the regions. The overlapping portions and melting provided by adjacent beams in adjacent regions prevents undesired incomplete Melting, or possible knit lines, within the completed part. In other words, each laser beam is capable of being directed to the overlapping region such that the part fabricated will include a complete melting and coverage of the metal powder during formation of the part. Like DE102005014483 A1, there is a limit on the speed of the build set by the time it takes the laser with the largest area of powder to be solidified to solidify this area. During this time, the other lasers will be underutilised.

JP2009006509 discloses a method of manufacturing a three-dimensional article with a plurality of laser beams. Each optical beam can be scanned by a dedicated module across the entire powder bed of the build area, with an area of powder to be solidified in the powder bed assigned to the lasers such that area to be scanned by each laser for each layer is equal. JP2002144437 and JP2000263650 disclose similar arrangements. U.S. Pat. No. 5,536,467 discloses apparatus for producing a three-dimensional object, wherein multiple laser beams are used to cure light curable resin. Each laser beam may be directed to predetermined regions of a layer to solidify those regions.

In all these arrangements, the fixed optical modules for scanning the laser beams must be spaced apart such that, for each module to be capable of directing the corresponding laser beam to any location in the powder bed, each optical module must be configured differently based on its location. This may require a sub-optimal arrangement of the optical module and/or non-utilisation of the fill range of the optical module across which the module provides an acceptable performance.

DE19953000 discloses a device for rapid production of bodies by selective sintering of powder layers. The device uses two laser beams that may be delivered together for sintering the powder, the first laser beam is brought to a small focus and the second to a large focus.

SUMMARY OF INVENTION

According to a first aspect of the invention there is provided a selective laser solidification apparatus, comprising; a powder bed onto which powder layers can be deposited, at least one laser module for generating a plurality of laser beams for solidifying the powder material deposited onto the powder bed, a laser scanner for individually steering each laser beam to solidify separate areas in each powder layer, a scanning zone for each laser beam defined by the locations on the powder bed to which the laser beam can be steered by the laser scanner, the laser scanner arranged such that each scanning zone is less than the total area of the powder bed and at least two of the scanning zones overlap, and a processing unit for selecting, for at least one of the powder layers, which laser beam to use to scan an area of the powder layer located within a region in which the scanning zones overlap.

By overlapping the scanning zones of the laser beams the same area can be built using different laser beams. In this way, there is flexibility in choosing which laser beam to use, allowing the processing unit to select a laser beam based on specified criteria. For example, the laser beam may be selected based on a total length of time each laser beam is used for solidifying areas in the powder layer. The laser beam may be selected to reduce or eliminate any difference in the total length of time each laser beam is used for solidifying areas in the powder layer. In this way, periods of non-utilisation of the laser beams are reduced or even eliminated. The selection of the laser beam may be a balance between competing factors, such as to reduce periods of non-utilisation of a laser beam balanced against solidifying areas in the powder layer that are upstream in the direction of gas flow, as described in our co-pending U.S. patent application No. 61/791,636.

Performance of a scanner tends to vary for different positions of the laser beam. For example, if the scanner comprises rotatable mirrors, an accuracy of the mirrors may vary dependent on angle. Furthermore, as the spot is moved away from a position in which the laser beam is perpendicular to the powder bed, the spot will become more elliptical. As the optics for individually steering each laser beam have to be physically spaced apart, a scanning zone over which a particular performance is achieved for each laser beam is likely not to coincide with the corresponding scanning zone for the other laser beams. By arranging the scanner such that each scanning zone is less than the total area of the powder bed, areas in which the scanner can direct a laser beam with a particular performance that do not overlap with corresponding areas for the other laser beams may be utilised whilst flexibility is retained for scanning areas of the powder bed that do fall within overlapping areas.

More than 10%, 20%, 30%, 40% or 50% of one scanning zone may overlap with another scanning zone. The laser scanner may be arranged such that each scanning zone overlaps another scanning zone, and preferable all adjacent scanning zones. The laser scanner may be arranged such that each scanning zone overlaps with every other scanning zone.

Each scanning zone may be an arc or a circle. For example, the powder bed may have a rectangular shape and the laser module may be arranged to generate four laser beams each having an arc shaped scanning zone, a circle centre of each arc shaped scanning zone located substantially at a different corner of the rectangular powder bed, the radii of the arcs being such that the scanning zones overlap.

Alternatively, each scanning zone is substantially a rectangle. For example, the powder bed may have a rectangular shape and the laser module may be arranged to generate four laser beams each having a rectangular scanning zone, each scanning zone aligned with a different corner of the powder bed.

The processing unit may be arranged to select the laser beam to use to scan the area of the powder layer within the region in which the scanning zones overlap based upon a parameter indicative of an angle of the laser beam to the powder layer when scanning the area.

The selection of the laser beam to use to scan an area of an object located within a region in which the scanning zones of the laser beams overlap may be carried out before the object is built. The processing unit may be arranged to determine a length of time each laser beam scans each powder layer based on a selection of the laser beams to use in scanning areas in each powder layer for a planned location of one or more objects to be built and to change the planned location of the one or more objects in the powder bed based on the determined lengths of time. For example, the object may be relocated to reduce or eliminate differences in the length of time the lasers scan areas in each layer.

According to a second aspect of the invention there is provided a method of selecting which one of a plurality of laser beams to use to scan an area of a powder layer in a selective laser solidification process, in which one or more objects are formed layer-by-layer by, repeatedly, depositing a layer of powder on a powder bed and scanning a plurality of laser beams over the deposited powder to selectively solidify at least part of the powder layers, wherein each laser beam is individually steered to solidify separate areas in each powder layer, a scanning zone for each laser beam defined by the locations on the powder bed to which the laser beam can be steered, each scanning zone is less than the total area of the powder bed and the scanning zones for at least two of the laser beams overlapping, the method comprising selecting, for at least one of the powder layers, which laser beam to use to scan an area of the powder layer located within a region in which the scanning zones of the laser beams overlap.

The method may be a computer-implemented method.

According to a third aspect of the invention there is provided a data carrier having instructions stored thereon, the instructions, when executed by a processor, cause the processor to carry out the method of the second aspect of the invention.

According to a fourth aspect of the invention there is provided a selective laser solidification apparatus, comprising; a powder bed onto which powder layers can be deposited, at least one laser module for generating a plurality of laser beams for solidifying the powder material deposited onto the powder bed, a laser scanner for individually steering each laser beam to solidify separate areas in each powder layer and a processing unit for selecting a location in the powder bed of an object or objects being built based on how scanning of the object or objects is divided between the plurality of laser beams.

According to a fifth aspect of the invention there is provided a method of selecting which one of a plurality of laser beams to use to scan an area of an object in a selective laser solidification process, in which one or more objects are formed layer-by-layer by, repeatedly, depositing a layer of powder on a powder bed and scanning a plurality of laser beams over the deposited powder to selectively solidify at least part of the powder layers, wherein each laser beam is individually steered to solidify separate areas in each powder layer, the method comprising selecting a location in the powder bed of an object or objects being built based on how scanning of the object or objects is divided between the plurality of lasers.

The method may be a computer-implemented method.

According to a sixth aspect of the invention there is provided a data carrier having instructions stored thereon, the instructions, when executed by a processor, cause the processor to carry out the method of the fifth aspect of the invention.

According to a seventh aspect of the invention there is provided a selective laser solidification apparatus, comprising; a powder bed onto which powder layers can be deposited, at least one laser module for generating a plurality of laser beams for solidifying the powder material deposited onto the powder bed, a laser scanner for individually steering each laser beam from spaced apart locations onto each powder layer, a scanning zone for each laser beam defined by the locations on the powder bed to which the laser beam can be steered by the laser scanner, the laser scanners arranged such that at least two of the scanning zones overlap or are coterminous, and a processing unit for selecting, for at least one of the powder layers, which one of the laser beams to use to scan a point on the powder layer in a region of the powder layer in which the scanning zones overlap/are coterminous based upon a parameter indicative of an angle of the laser beam to the powder layer when scanning the point.

In this way, a quality of the spot produced by the laser beam when scanning the point may be taken into account when selecting the laser beam to use to solidify the point in the powder layer. For example, favouring a laser beam that is at a smaller angle to the powder bed when scanning the point than another of the lasers may result in a better quality spot (more circular, smaller radius) being used when possible. Furthermore, crossing of the laser beams may be limited/avoided by favouring the laser beam that is at a smaller angle to the powder bed when scanning the point. It may be desirable to avoid crossing of the laser beams because of the thermal lensing effects produced by each laser beam and the effect such thermal lensing has on the other laser beam.

In this aspect of the invention, the laser seamier may be arranged to steer each laser beam over only part of or the entire powder bed.

According to an eighth aspect of the invention there is provided a method of selecting which one of a plurality of laser beams to use to scan a point on a powder layer in selective laser solidification process, in which one or more objects are formed layer-by-layer by, repeatedly, depositing a layer of powder on a powder bed and scanning a plurality of laser beams over the deposited powder to selectively solidify at least part of the powder layers, wherein each laser beam is individually steered from spaced apart locations onto each powder layer, a scanning zone for each laser beam defined by the locations on the powder bed to which the laser beam can be steered by the laser scanner, the laser scanners arranged such that at least two of the scanning zones overlap or are coterminous, the method comprising selecting, for at least one of the powder layers, which one of the laser beams to use to scan a point on the powder layer in a region of the powder layer in which the scanning zones overlap/are coterminous based upon a parameter indicative of an angle of the laser beam to the powder layer when scanning the point.

According to a ninth aspect of the invention there is provided a data carrier having instructions stored thereon, the instructions, when executed by a processor, cause the processor to carry out the method of the eighth aspect of the invention.

The data carrier of the above aspects of the invention may be a suitable medium for providing a machine with instructions such as non-transient data carrier, for example a floppy disk, a CD ROM, a DVD ROM/RAM (including –R/–RW and +R/+RW), an HD DVD, a Blu Ray™ disc, a memory (such as a Memory Stick™, an SD card, a compact flash card, or the like), a disc drive (such as a hard disk drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF THE DRAWINGS

Embodiments of the invention will now be described, as examples only, with reference to the accompanying drawings, in which:—

FIG. 5a is a schematic cross-section of laser solidification apparatus according to a further embodiment of the invention along the line A-A;

FIG. 5b is a plan view of the scanning zones of the laser solidification apparatus shown in FIG. 5a;

FIG. 6a is a schematic cross-section of laser solidification apparatus according to another embodiment of the invention comprising movable optical modules;

FIG. 6b is a plan view of the scanning zones of the laser solidification apparatus shown in FIG. 6a.

DESCRIPTION OF EMBODIMENTS

Figure 1:
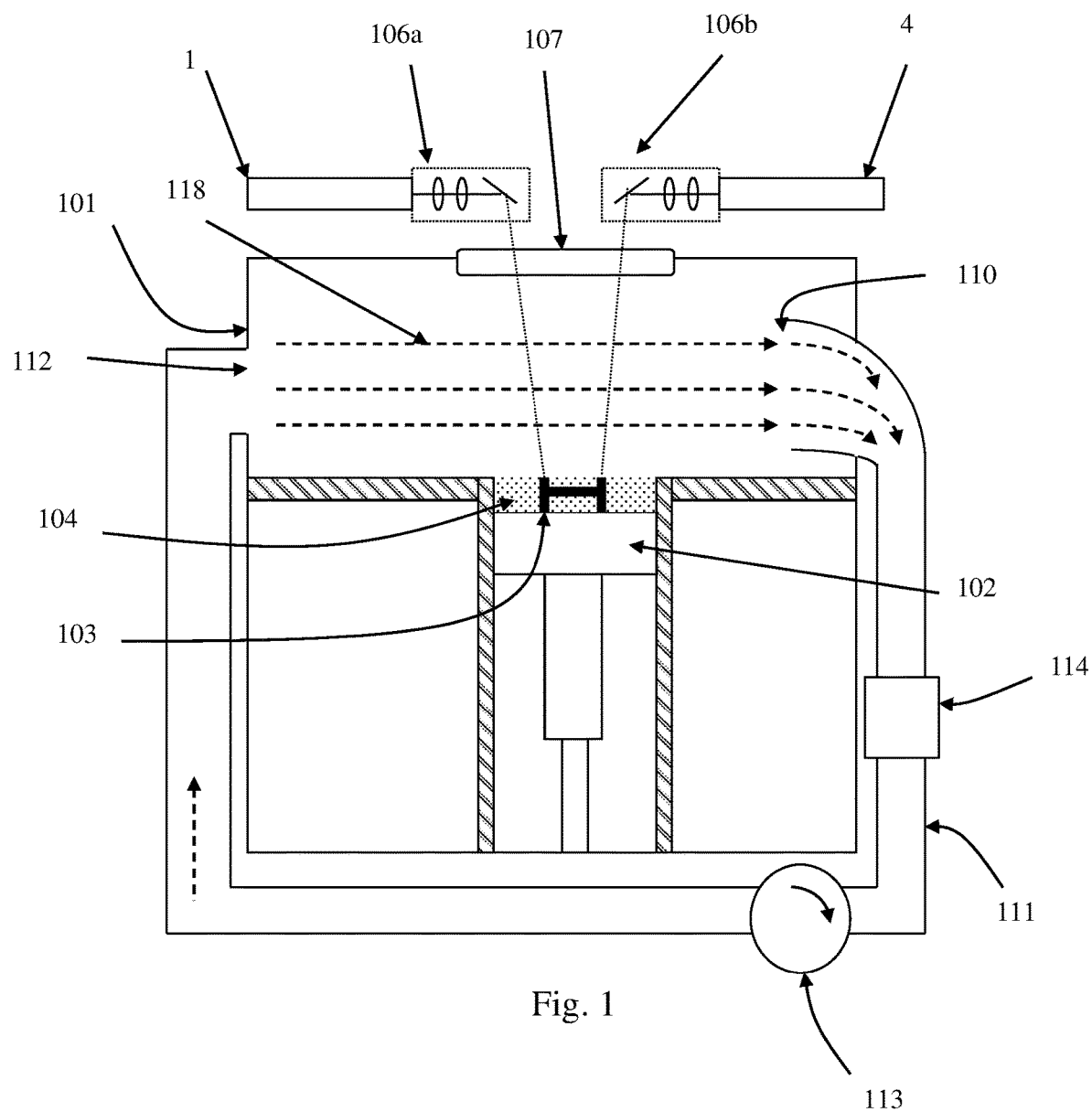
FIG. 1 is a schematic view of a laser solidification apparatus according to one embodiment of the invention.
Figure 2:
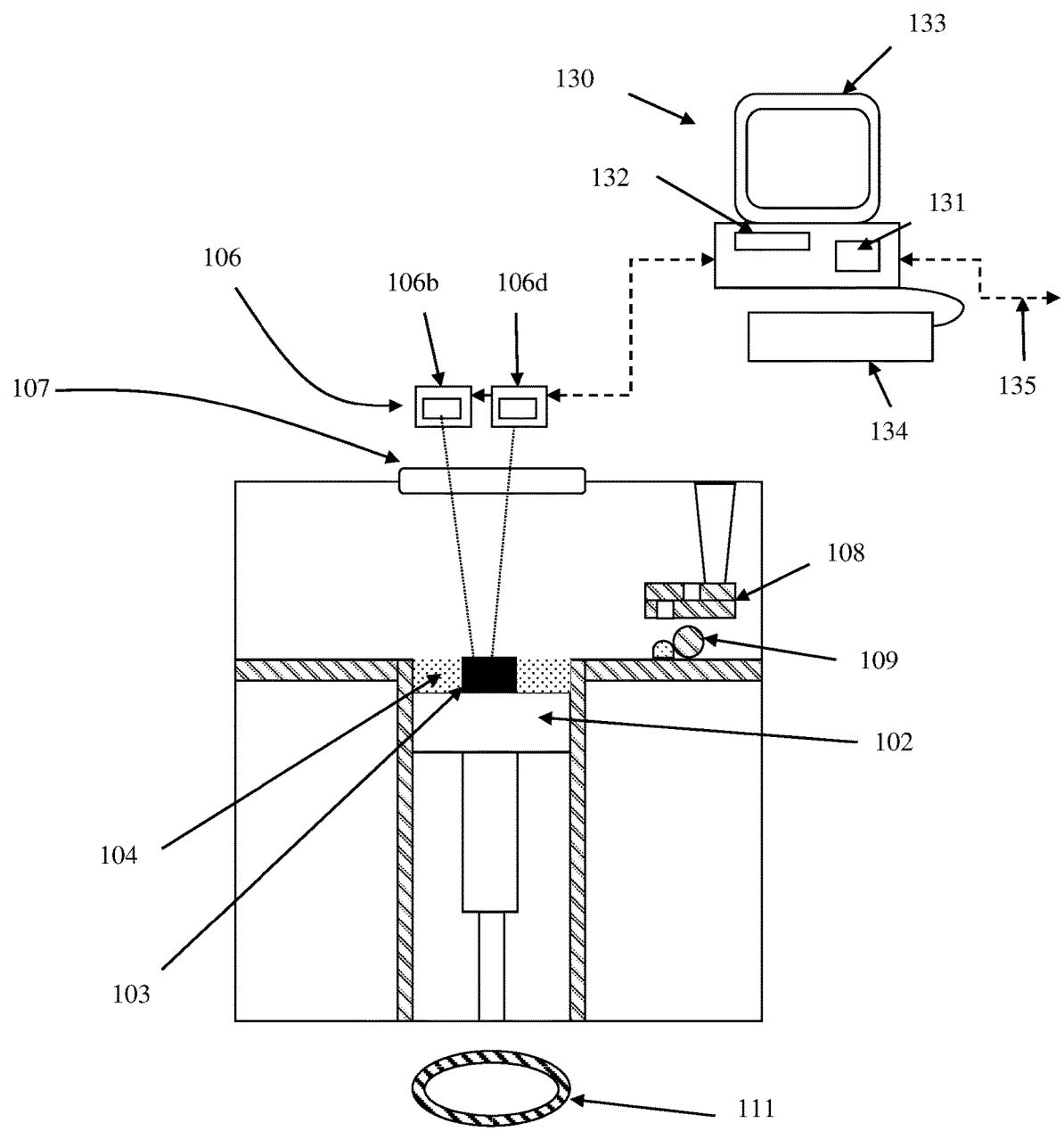
FIG. 2 is a schematic view of the laser solidification apparatus from another side.
Figure 3:
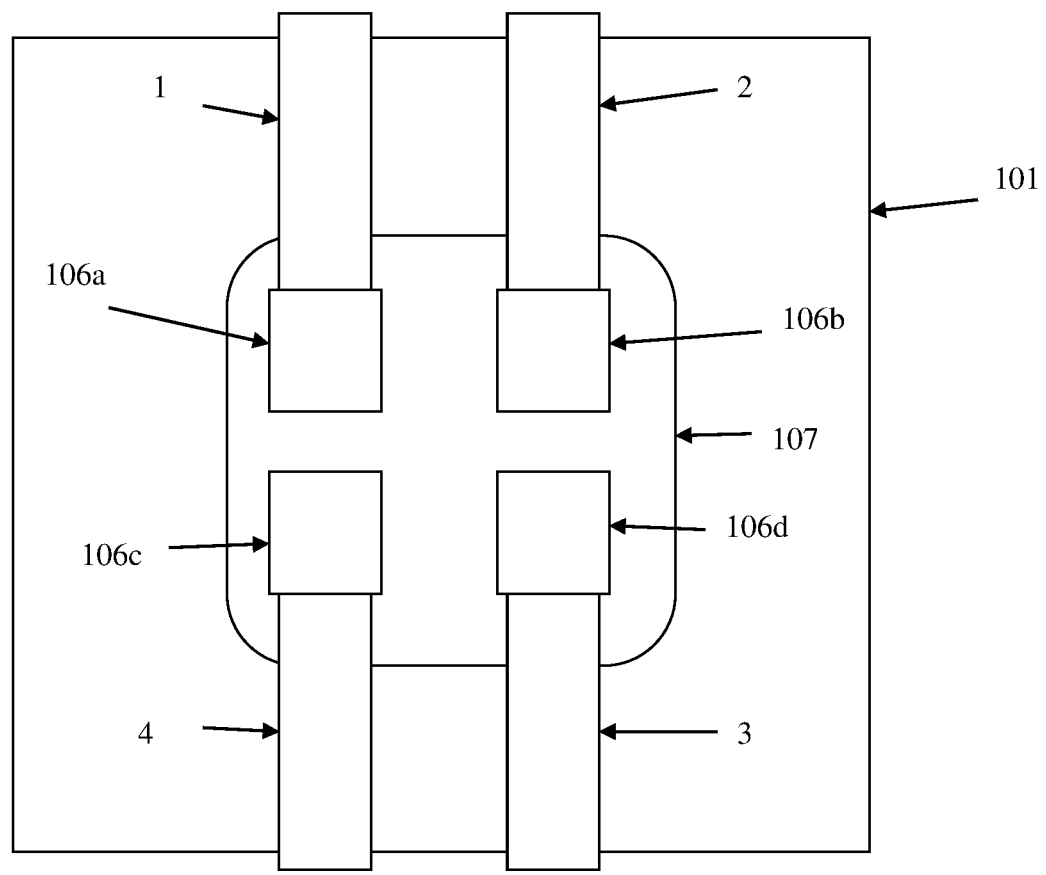
FIG. 3 is a plan view of the laser solidification apparatus shown in FIGS. 1 and 2.

Referring to FIGS. 1 to 3, a laser solidification apparatus according to an embodiment of the invention comprises a build platform 102 for supporting an object 103 built by selective laser melting powder 104. The platform 102 can be lowered in the chamber 101 as successive layers of the object 103 are formed. Layers of powder 104 are formed as the object 103 is built by dispensing apparatus 108 and a wiper 109. For example, the dispensing apparatus 109 may be apparatus as described in WO2010/007396. Laser modules 1, 2, 3 and 4 each generate a laser beam for melting the powder 104, each laser beam directed as required by corresponding optical modules 106a to 106d wider the control of a computer 130. The laser beams enter the build chamber via a window 107. Each laser beam can be independently steered to solidify separate areas of the powder bed 104. The range of locations to which each laser beam can be steered on the powder bed 104 defines a scanning zone, illustrated in FIG. 4 by dotted lines 1a, 2a, 3a and 4a. The scanning zone for each laser beam overlaps the scanning zones for the other laser beams such that for certain regions in the powder bed, more than one laser beam is capable of solidifying an object to be built at that location.

An inlet 112 and outlet 110 are arranged for generating a gas flow across the powder bed formed on the build platform 102. The inlet 112 and outlet 110 are arranged to produce a laminar flow having a flow direction from the inlet to the outlet, as indicated by arrows 118. Gas is re-circulated from the outlet 110 to the inlet 112 through a gas recirculation loop 111. A pump 113 maintains the desired gas pressure at inlet 112 and openings 5, 6. A filter 114 is provided in the recirculation loop 111 to filter from the gas condensate that has become entrapped in the flow. It will be understood that more than one inlet 112 may be provided in the build chamber 101. Furthermore, rather than extending outside of the build chamber 101, the recirculation loop 111 may be contained within the build chamber 101.

Computer 130 comprises a processor unit 131, memory 132, display 133, user input device 135, such as a keyboard, touch screen, etc, a data connection to modules of the laser sintering unit, such as optical module 106a to 106d and laser modules 1 to 4, and an external data connection 135. Stored on memory 132 is a computer program that instructs the processing unit 131 to carry out the method described with reference to FIGS. 4 and 5.

Geometric data of objects to be built, such as in the form of an STL file, are received 201 by the computer 130, for example over the external data connection 135, The processing unit 131 receives 202 information on the location of the objects on the build platform 102. This location information may already be defined in the STL or the user may select, using the user input device 135, where each object should be located on the build platform 102.

The processor unit 131, for each layer, identifies areas of the powder bed to be solidified and the laser beams 1,2,3,4 to use for scanning these areas. In the example shown in FIG. 4, the areas to be solidified comprise a number of islands 5, 6 and 7. Different sections of the islands 5, 6 and 7 fall within the scanning zones of different laser beams 1, 2, 3 and 4. For example, for island 5, one section can only be scanned by laser beam 1, another section by laser beams 1 or 2, a further section by laser beams 1 or 4 and final section by laser beams 1, 2 or 4. Based on the laser beams 1, 2, 3 4 that can scan each section and the areas of the sections, the processing unit 131 selects a laser beam 1,2,3,4 to scan a section such that the total length of time each laser beam 1, 2, 3, 4 scans the bed is approximately equal or at least as close as possible given other constraints on the system. As shown for island 5, the island may be split into sections based upon how the island 5 is bisected by the scanning zones 1*a*, 2*a*, 3*a* and 4*a*, the processing unit 131 selecting the laser beam to be used to scan each section. In the example, laser beam 1 is used to scan the two uppermost sections, laser beam 4 the lower left section and laser beam 2 the lower right section. Island 6 is not only sectioned along the bisecting lines of the scanning zones 1*a*, 2*a*, 3*a* and 4*a* but the processing unit 131 has introduced an additional sectioning indicated by dotted line 9. Such additional sectioning may be used to obtain the required scan times for each laser beam 1, 2, 3, 4.

Using the borders of the scanning zones 1*a*, 2*a*, 3*a*, 4*a* as a first means of dividing up an island into different sections may be beneficial as these lines demarcate the sections where different laser beam options are available. However, even if an island is not bisected by a border of a scanning zone, the island may still be sectioned to obtain the required scan time for each laser beam 1, 2, 3 and 4 if it falls within an overlapping region of two or more scanning zones. This is illustrated by island 7, which is divided into two sections along line 8, one section scanned by laser beam 3 and the other by laser beam 4. An interface between sections scanned by different laser beams 1, 2, 3 and 4 has a wavy or stepped shape to key the adjacent sections together (as illustrated by the magnified section of line 8). Similar formations may be used between the interfaces of all sections.

By selecting the sections such that the total area allocated to each laser beam is approximately equal, the scan time for each laser beam should be approximately equal. However, there may be other factors to take into account in determining scan times, which may depend on the layer being built.

Figure 4:
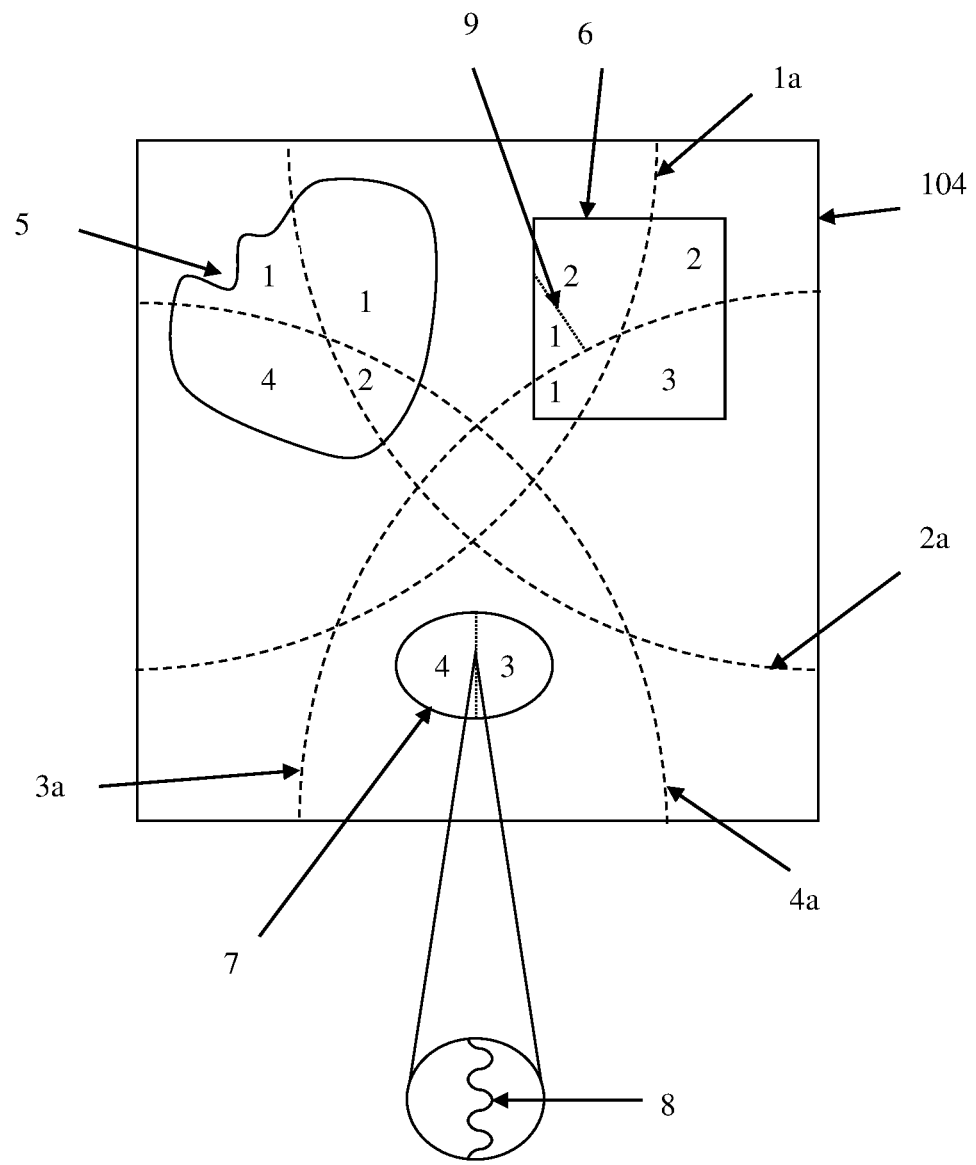
FIG. 4 is an illustrative example of areas to be solidified in a powder layer and the scanning zones of the lasers

For example, in the known "shell and core" method for forming an object, a core of an object may be solidified by scanning with a large diameter laser spot and a shell (outer periphery) of the object formed using a small diameter laser spot. Such a method is disclosed in U.S. Pat. No. 5,753,171, WO91/12120 and EP0406513. A similar technique can be used in this method. Varying the spot size when forming the core and shell of the object may affect the scan speed of the laser beam for these different regions. Accordingly, the processing unit 131 may take these different scan speeds into account when allocating a section to different laser beams. This may mean that determining the division of sections between the laser beams purely based on area may be insufficient and the length of an outer edge of the section (which, in the final object, forms a surface of the object) may be taken into account when determining a scan time of the laser beams. For example, in FIG. 4, island 5 is an irregular shape. The section in the top left corner has a small area relative to the length of the edge when compared to other sections of island 5 and other sections of the other islands 6 and 7. Accordingly, it will take longer to scan this section than for sections of similar area due to the longer time in forming a shell with a small diameter laser spot. Therefore, in one embodiment, when determining a scan time for a section, a length of the edge included in the section is taken into account.

In a further embodiment, the shell around a single island 5, 6, 7 may be formed, if possible, by a single laser beam rather than forming the shell for different sections of the island with different laser beams allocated to these different sections. This may avoid the need to knit together the shell at the interfaces of the section. However, the time it takes in forming the shell may have to be taken into account when determining the scan time for the laser beam allocated the task of forming the shell.

The bottom and top layers of the object may not be formed using the shell and core method and therefore, such calculations may not apply to these layers.

The shape of a section may also affect the time it takes to scan the section. For example, a long thin section may take longer to scan using a raster scan that scans across the entire section (so called "meander" scan) than a wider short section even if the areas of the sections are the same because the scanning of the laser beam slows as the direction of the scan is changed. If there are many changes in direction, as would be the case for a long thin section, then this will slow the scan relative to only a few changes in direction, as would be the case for a wider section. This may be taken into account when determining the time it takes to scan a section. However, there may be scanning strategies that mitigate the impact of changes in direction due to the shape of the section, such as chequerboard or stripe scanning, as disclosed in EP1441897 and EP1993812, respectively. For sections that are much larger than the width of a stripe or square of the chequerboard, the number of changes in direction is not dominated by the shape being scanned but by the number of stripes or squares of the chequerboard that fit within the section (which will be dependent on the area of the section).

A further place where changes in direction could affect scan speed is at the edges when forming the shell in the shell and core method. In particular, for an edge with a large number of changes in direction the scan speed will be slower than for the same length edge but with few changes in direction. Again, this may be n factored into the calculations of the processing unit 131 when determining the length of time it takes for a laser beam to scan a section.

A further factor that may be taken into account when selecting a laser beam to solidify an area of the powder bed that falls within an overlapping region is a shape of the spot produced by the laser beam at that location. Typically, the optical modules 106*a* to 106*d* are arranged to generate a circular spot when the laser beam is directed perpendicularly to a plane of the powder layer. Directing the laser beam away from the perpendicular produces an elliptical spot, wherein the greater the angle, the greater a radius of the spot, Variations in the spot size and shape may vary the properties of the solidified material. Accordingly, the processing unit 131 may select the laser beam 1, 2, 3, 4 to use to solidify an area/point within an area that falls within an overlapping region based upon an angle of the laser beam when solidifying the area/point. A distance of the area/points from a reference point (illustrated by points 251*a* to 251*d* in FIG. 5*b*) of each scanning zone at which the laser beam is perpendicular to a plane of the powder layer may be used as a value representative of the angle. For example, a quantity of the area of powder to be solidified in a layer by each laser beam 1, 2, 3 and 4 may be divided, as far as possible, equally between the lasers 1, 2, 3 and 4, but lines along which the area(s) are divided between the laser beams 1, 2, 3 and 4 may be based on a distance of each point in the area(s) to be solidified from the reference point of each scanning zone.

On completion of the selection of the laser beams 1,2,3,4 to use in scanning the areas of each powder bed to be solidified, the results may be displayed to a user for review, Using the input device, the user may be able to adjust the location of the object(s), the processing unit 131 re-selecting the laser beams to be used to scan the areas for the new location(s) of the object(s). This may enable a user to minimise a scan time of the object(s) being built.

In one embodiment, the processing unit 131 automatically re-adjusts the location(s) of the object(s) in the powder bed to minimise the build time.

On activating a build, the processing unit 131 sends instructions to the optical modules 106a to 106d to control the laser beams to scan the powder layers in the manner selected.

It will be understood that in another embodiment, rather than each laser module providing a single laser beam to solidify the powder bed 104, the laser beam generated from one or more laser modules may be optically divided into More than one laser beam, each part of the divided laser beam individually steered on to the powder bed. Such an arrangement may be appropriate with a high powered laser module, for example a 1 KW nd-YAG fibre laser could be divided into four separate laser beams, each laser beam having sufficient power the melt metal powder. In a further embodiment, the optics may be arranged such that the number of parts into which the or each laser beam is divided can be reconfigured in response to a selection by the user or by the computer. Such an arrangement may be appropriate when the apparatus is to be used with different materials, which require different laser powers to melt powder of that material. For example, for a material with a high melting point, the laser beam(s) may be divided into fewer parts (or not divided at all), whereas for materials with lower melting points, the laser beam(s) may be divided into a greater number of parts.

FIGS. 5a and 5b show an alternative arrangement of scanning zones 201a, 201b, 201c and 201d for apparatus comprising a scanner with four optical modules 106a, 106b, 106c, 106d, In this arrangement, the optical modules are arranged such that the scanning zone 201a, 201b, 201c, 201d for each laser beam 1, 2, 3, 4 is substantially rectangular. For example, the optical modules 106a, 106b, 106c, 106d may comprise two rotatable mirrors for directing the laser beam, the mirrors rotatable around perpendicular axis to scan the beam in two-dimensions in a plane of a working surface of the powder bed 204. Each optical module 106a, 106b, 106c, 106d is substantially the same and generates a scanning zone 201a, 201b, 201c, 201d at the same location relative to the optical module 106a, 106b, 106c, 106d. Accordingly, as the optical modules 106a, 106b, 106c, 106d are physically spaced apart, as shown in FIG. 5a by a distance, D, the scanning zones overlap, hut are not coterminous, with regions 210 to 217 of the powder bed 104 to which one or more, but not all, of the laser beams 1, 2, 3, 4 can be directed and a central region 218 to which all four of the laser beams 1, 2, 3, 4 can be directed.

In a similar manner as described with reference to FIG. 4, in regions 211, 213, 215, 217 and 218 in which scanning zones of the optical modules overlap, the processing unit 131 selects which one of the plurality of laser beams 1, 2, 3, 4 to use to scan areas of the powder bed 104 to be solidified that fall within these regions. For example, the processing unit 131 may select the laser beam in order that, as far as possible, each laser beam 1, 2, 3 and 4 is used for a substantially equal length of time to solidify areas within each layer of powder.

Now referring to FIGS. 6a and 6b, a further laser solidification apparatus is shown. In this apparatus, the laser scanner comprises optical modules 306a to 306e mounted on a member 340 movable along track 341. In this way, the optical modules 306a to 306e are movable within the build chamber.

Figure 7:
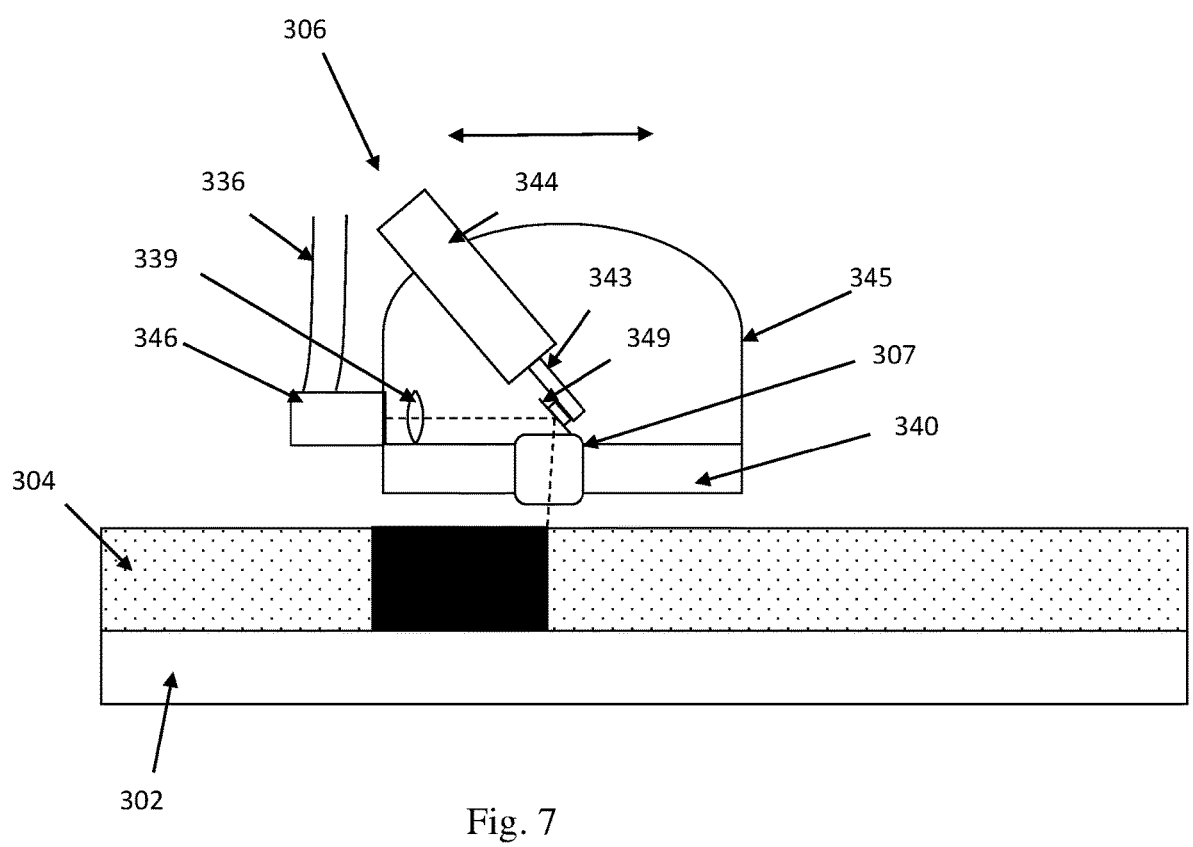
FIG. 7 is a cross-sectional view of an optical module for use in the laser solidification apparatus shown in FIGS. 6a and 6b.

FIG. 7 shows an optical unit 306 in more detail. Each optical module 306 comprises a sealed housing 345 containing a lens 339 for focussing the laser beam and an optical element, in this embodiment a mirror 349, for steering the laser beam through window 307 onto the powder bed 304 along a line (represented by the arrows in FIG. 6b) perpendicular to the direction of movement of member 340. The mirror 349 is mounted on a shaft 343 for rotation about an axis under the control of a motor 344. The housing comprises a connection 346 for connecting the housing to an optical fibre 336 that carries the laser beam. Each optical module 306 may be separately removably mountable onto the member 340. In this embodiment, each module 306 is capable of steering a laser beam over similar length lines.

The combined movement of the optic element 349 and the member 340 enables each laser beam to be directed into a respective scanning zone 301a to 301e. The optical modules are arranged such that each scanning zone 301a, 301h, 301e, 301d, 301e overlaps with an adjacent scanning zone(s) 301a, 301b, 301c, 301d, 301e. Like the first embodiment, each optical module 306 is controlled by a processing unit, the processing unit arranged to select which one of the plurality of laser beams to use to scan areas of the powder bed 304 to be solidified that fall within regions in which the scanning zones 301a, 301b, 301c, 301d, 301e overlap. The processing unit may make the selection in order to maximise a velocity at which the member 340 can be moved over the powder bed and/or to minimize a number of passes of the member 340 over the powder bed 304 required for solidification of the specified areas of each powder layer.

In a further embodiment, the optical modules 306a to 306e comprise movable optics for directing the laser beams over an area rather than a line (i.e. the laser beam can be moved in a direction of movement of the member 340 by the optics as well as by movement of member 340). This may provide for greater flexibility when selecting which laser beam to use to solidify an area of the powder bed that falls within overlapping regions of the scanning zones.

Alterations and modifications to the above described embodiments can be made without departing from the scope of the invention as defined herein. For example, the laser scanner may be capable of steering each laser beam over the entire powder bed and the processing unit 131 may be arranged to select which one of the laser beams to use to scan areas of a powder layer to be solidified such that each laser is used for approximately an equal length of time during solidification of the areas with the areas to be solidified divided between the lasers based upon an angle of the laser beam to the powder layer when scanning the areas.

The invention claimed is:

1. A selective laser melting additive manufacturing apparatus, comprising;
   a build platform for supporting a powder bed onto which layers of powder material can be deposited;
   a plurality of lasers, each laser for generating a laser beam for melting the powder material deposited onto the powder bed;
   a build chamber for enclosing a working surface of the powder bed, the build platform being lowerable in the build chamber as successive layers of the powder material are formed on the powder bed;
   a window in the build chamber configured to allow the laser beams to enter the build chamber via the window; and a plurality of optical scanners, each optical scanner comprising rotatable mirrors for individually steering a corresponding laser beam of the plurality of laser beams though the window to melt separate areas in each powder layer, wherein a scanning zone for the corresponding laser beam of each optical scanner is defined by locations on the working surface of the powder bed to which the corresponding laser beam can be steered by the rotatable mirrors of the optical scanner, and the plurality of optical scanners are arranged such that a spatial relationship between the scanning zones remains fixed during a build and at least two of the scanning zones overlap or are coterminous.

2. The selective laser melting additive manufacturing apparatus according to claim 1, wherein the window is located in a roof of the build chamber centred above the powder bed.

3. The selective laser melting additive manufacturing apparatus according to claim 1, wherein each of the plurality of optical scanners is positioned such that the corresponding laser beam exits the optical scanner from a location directly above the window.

4. The selective laser melting additive manufacturing apparatus according to claim 1, wherein the plurality of optical scanners comprises four optical scanners.

5. The selective laser melting additive manufacturing apparatus according to claim 1, wherein the rotatable mirrors of each optical scanner comprise a first mirror rotatable about a first axis and a second mirror rotatable about a second axis, and wherein the first axis and the second axis are relatively oriented such that the optical scanner is capable of scanning the corresponding laser beam in two-dimensions in a plane of the working surface of the powder bed.

6. The selective laser melting additive manufacturing apparatus according to claim 1, comprising a processing unit configured to, for at least one of the powder layers, melt an area of the powder layer located within a region in which the scanning zones overlap or are coterminous using only one of the laser beams.

7. The selective laser melting additive manufacturing apparatus according to claim 1, wherein the plurality of optical scanners are arranged such that each scanning zone overlaps or is coterminous with another scanning zone.

8. The selective laser melting additive manufacturing apparatus according to claim 7, wherein the plurality of optical scanners are arranged such that each scanning zone overlaps with or is coterminous with every other scanning zone.

\* \* \* \* \*